United States Patent
Bishard

(10) Patent No.: US 7,362,749 B2
(45) Date of Patent: Apr. 22, 2008

(54) QUEUING CLOSED LOOP CONGESTION MECHANISM

(75) Inventor: Clint J. Bishard, Skiatook, OK (US)

(73) Assignee: Verizon Business Global LLC, Basking Ridge, NJ (US)

( * ) Notice: Subject to any disclaimer, the term of this patent is extended or adjusted under 35 U.S.C. 154(b) by 854 days.

(21) Appl. No.: 10/087,132

(22) Filed: Mar. 1, 2002

(65) Prior Publication Data
US 2003/0165148 A1    Sep. 4, 2003

(51) Int. Cl.
*H04L 12/50* (2006.01)
(52) U.S. Cl. ................................ 370/357
(58) Field of Classification Search ........ 370/229–238, 370/351, 357, 389, 391, 395.2, 395.21
See application file for complete search history.

(56) References Cited

U.S. PATENT DOCUMENTS

| | | | |
|---|---|---|---|
| 5,231,633 A * | 7/1993 | Hluchyj et al. | 370/429 |
| 5,696,764 A * | 12/1997 | Soumiya et al. | 370/395.41 |
| 5,872,769 A * | 2/1999 | Caldara et al. | 370/230 |
| 6,188,698 B1 * | 2/2001 | Galand et al. | 370/412 |
| 6,317,416 B1 * | 11/2001 | Giroux et al. | 370/232 |
| 6,480,911 B1 * | 11/2002 | Lu | 710/54 |
| 6,904,015 B1 * | 6/2005 | Chen et al. | 370/235 |
| 6,975,630 B1 * | 12/2005 | Kusumoto | 370/395.41 |

* cited by examiner

*Primary Examiner*—Dmitry Levitan

(57) ABSTRACT

An exemplary queuing congestion mechanism and method are disclosed that provide congestion management at an egress port of a packet switch. The queuing congestion mechanism includes at least a first, a second and a third queue, which each have an input, an output, and a capacity. Each queue is operable to receive packets of information of a designated type, such as a service category type, at its input that are destined to be communicated to the egress port through its output. The queuing congestion mechanism further includes a scheduler and a queue shaper. The scheduler, which may be implemented as a strict scheduler, is operable to receive the packets of information from the output of the queues and to communicate the packets of information to the egress port of the packet switch based on a schedule. The queue shaper is operable to set an adjustable rate in which the packets of information of the third queue are communicated to the scheduler, and the adjustable rate is controlled by a loading of the capacity of the second queue. The queuing congestion mechanism may include a discard policy that is enabled for one or more of the queues and that is based on the loading of the capacity of one of the other queues.

20 Claims, 3 Drawing Sheets

QUEUING CLOSED LOOP CONGESTION MECHANISM

TECHNICAL FIELD OF THE INVENTION

This invention relates in general to the field of telecommunications and packet networks and more particularly to a queuing congestion mechanism, such as a queuing closed loop congestion mechanism, for use in managing and reducing congestion in packet or data networks and/or packet switches.

BACKGROUND OF THE INVENTION

The need for both voice telephony services as well as data services is common. Traditionally, voice communications or voice telephony was provided over traditional circuit-dedicated or circuit-switched telecommunications networks, which are bandwidth inefficient when compared to data or packet networks (hereinafter "packet networks"). For a variety of reasons, including reduced overall costs, increased efficiency, and the popularity of the Internet and other packet networks, the demand for exchanging real-time or near real-time information, such as voice and video, over such packet networks has dramatically increased.

Unfortunately, the increased demand for the use of packet networks to exchange real-time information has resulted in increased congestion of such packet networks. Congestion of packet networks is further complicated by the need to provide different levels or classes of services for the exchange of voice and video over packet networks. The different levels or classes of services may include, for example, Quality of Service ("QoS") guarantees, reserved bandwidth or data rates, and guaranteed error and/or delay levels. Unfortunately, since not all packet network technology was originally designed to support the real-time exchange of voice and/or video information, the capability to implement the different levels or classes of services, while also providing a solution to the congestion problem mentioned above, is considerably challenging.

Packet networks are made up of data or packet switches, such as, for example, Asynchronous Transfer Mode ("ATM"), MultiProtocol Label Switching ("MPLS"), Frame Relay, X.25, Ethernet, and Internet Protocol ("IP") switches. Packet networks have data packets, cells, frames or blocks (hereinafter "packets" or "cells") that are either of fixed length or variable length. In general, packet networks were originally designed to exchange non-real time data and to operate on a best-effort delivery basis such that all traffic has equal priority and an equal chance of being delivered in a timely manner, in contrast with the needs of voice or video communications. Some of the packet-switched technologies that may be used for voice communications include, without limitation, Voice Telephony over ATM ("VToA"), Voice over Frame-Relay ("VoFR"), Voice over Digital Subscriber Line ("VoDSL"), and Voice over IP ("VoIP").

A packet network or packet switch is considered to be in a congested state when the total bandwidth of the packets entering the output queues of a packet switch at an egress port becomes greater than the bandwidth available at the egress port. Congestion management within packet switches has traditionally focused on two software approaches, each with their own advantages and disadvantages. The first approach involves the implementation of a priority scheme used by a scheduler and may be referred to as the "strict scheduler" approach. The second approach involves the enforcement of policy decisions that stop certain packets from entering an output queue (hereinafter "queue") if the queue gets to a certain fill level. This approach may be referred to as the weighted fair queuing ("WFQ") scheduler approach. The distinction between these two common congestion management approaches concerns the manner in which the scheduler arbitrates between the different queues.

The strict scheduler approach involves performing a strict prioritization on the different queues. For a given time where bandwidth is available to the egress port, the scheduler in such an approach simply checks the highest priority queue first. If there is a packet in the highest priority queue, then, it is sent to the egress port, otherwise the scheduler looks to the next highest queue for a packet to send to the egress port. This cycle is repeated through all the queues until the scheduler finds a packet to send. Once a packet is sent, the cycle is repeated, again starting with the highest queue on down. This works well for the higher QoS traffic since they are given absolute priority over the lower QoS queues. Thus, the delay or delay variation for the transmission of the packets will be low for such high priority traffic, which is necessary for real time services and applications such as voice and video.

The problem with the strict scheduler approach is that the lower QoS traffic can be choked out at the expense of higher QoS traffic that, in some situation, could be dropped due to other policy decisions. For example, in the case of ATM traffic, non-conformant rt-VBR (CLP=1—not guaranteed by network) traffic would have priority over the lower service category conformant nrt-VBR (CLP=0—guaranteed by the network) traffic. This problem can be particularly limiting to the service provider. The service provider is forced to use lower oversubscription rates, which results in a lower network efficiency, lost revenue, and a lower return on investment.

The WFQ scheduler approach utilizes a weighted fair queuing scheduler between the various queues of an egress port of a packet switch. The WFQ scheduler determines how much bandwidth should be reserved for each QoS traffic by the weight that is associated with the connections or traffic belonging to each particular QoS queue. For example, if the weight of the highest QoS queue is such that it requires 5% of the link or egress port bandwidth, then the queue is guaranteed 5% of such bandwidth. Each queue is now isolated from the other queues in that each queue is given a certain percentage of the link or egress port bandwidth. Further, if one of the queues begins to back up because of congestion, then a policy based discard threshold may be enabled to drop packets according to the chosen policy for that QoS queue. This function is also isolated from the other queues.

The problem with the WFQ scheduler approach is that the delay and delay variation for real time services (assumed to be higher QoS queues) have been increased. This is a result of the higher priority queues not having full access to the link bandwidth before the other queues. For example, if a lower priority queue was weighted such that it required 90% of the link or egress port bandwidth, then packets in a higher priority queue may be delayed given the lower priority queue's 90% link or egress port bandwidth. Also, as with the strict scheduler approach, policy based decisions between the queues are not utilized. Additionally, the isolation and independence of the different queues forces any oversubscription to be performed individually for each queue or QoS traffic type, resulting in less allowable total oversubscription for a given link.

Another congestion management approach, which will not be discussed in detail herein, involves a packet switch to packet switch congestion management technique that includes a first packet switch communicating to a downstream second packet switch that it is becoming congested and requesting the second packet switch to reduce its data rate for a particular queue or QoS traffic so that the first packet switch can recover from the congestion.

SUMMARY OF THE INVENTION

From the foregoing it may be appreciated that a need has arisen for a queuing congestion mechanism, such as a queuing closed loop congestion mechanism, that provides the capability for packet networks to efficiently and effectively manage data congestion while still providing the desired levels or classes of services and allowing a more optimal network oversubscription. In accordance with the present invention, a queuing closed loop congestion mechanism and methods are provided that substantially eliminate one or more of the disadvantages and problems outlined above.

According to one aspect of the present invention, a queuing congestion mechanism is disclosed that provides congestion management at an egress port of a packet switch. The queuing congestion mechanism includes at least a first, a second and a third queue, which each have an input, an output, and a capacity. Each queue is operable to receive packets of information of a designated type, such as a service category type, at its input that are destined to be communicated to the egress port through its output. The queuing congestion mechanism further includes a scheduler and a queue shaper. The scheduler is operable to receive the packets of information from the output of the queues and to communicate the packets of information to the egress port of the packet switch based on a schedule. The queue shaper is operable to set an adjustable rate in which the packets of information of the third queue are communicated to the scheduler, and the adjustable rate is controlled by a loading of the capacity of the second queue.

According to another aspect of the present invention, the queuing congestion mechanism includes a discard policy that is enabled for one or more of the queues and that is based on the loading of the capacity of one of the other queues.

According to another aspect of the present invention, a method for performing queuing closed loop congestion management in a packet switch of a packet network is provided. The method includes monitoring the loading of the capacity of a first queue, a second queue, and a third queue provided to hold packets of information communicated through a packet network, and setting an adjustable data rate to communicate the packets of information of the third queue to a scheduler based on the loading of the capacity of the second queue. The method further includes scheduling the communication of the packets of information from the first queue, the second queue, and the third queue to the egress port of the packet switch based on a schedule, and enabling a discard policy for the third queue based on the loading of the capacity of the second queue.

The present invention provides a profusion of technical advantages that include the capability to provide a needed or desired QoS for the queues or traffic of a packet switch, while allowing additional network oversubscription, as compared to prior congestion management techniques, that results in greater overall packet network performance, service provider revenues, and return on network investment.

Another technical advantage includes the capability to provide congestion management in a packet switch where a first queue or first QoS traffic is controlled or dependent on a second queue or second QoS traffic. This may be referred to as "closed loop" congestion management and the present invention may allow one or more output queues of a packet switch to control one or more other output queues of the same packet switch. For example, the data rate that a first queue provides its output to a strict scheduler at the egress port of a packet switch may be dependent on the congestion of a second queue. Stated another way, the rate at which the first queue is serviced at the egress port is dependent on the congestion of the second queue.

Yet another technical advantage of the present invention includes the capability to use inputs derived from a first queue of a packet switch to enable or enforce policy decisions at one or more other queues.

The present invention provides the significant technical advantage that includes the capability to provide a scalable solution that may be implemented at one or more egress ports of one or more packet switches of a packet network without any bandwidth or connection limitations.

Yet another technical advantage of the present invention concerns the capability to provide congestion management to virtually any packet switch technology or protocol, including those that utilize fixed or variable length packets or cells.

Another technical advantage of the present invention includes the capability to ensure that the higher priority queues, which often carry higher QoS traffic such as real-time services, are guaranteed the lowest delay and delay variation possible, while providing the capability to perform desired policy based decisions between the various queues of a packet switch.

Yet another technical advantage of the present invention includes the capability to easily implement and utilize the invention almost anywhere that data congestion could occur on a packet based network, regardless of the type of technology—ATM, MPLS, FR, IP, or Ethernet.

Another technical advantage of the present invention includes the capability to use relatively simple algorithms in software to implement the present invention without requiring heavy computer processing, such as is required with per connection shaping solutions.

Yet another technical advantage of the present invention includes the capability to use policy based congestion management that is knowledgeable of all of the traffic on a packet network, which can simplify data traffic engineering as well as remove possibilities of a service provider violating a service level agreement with a customer.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
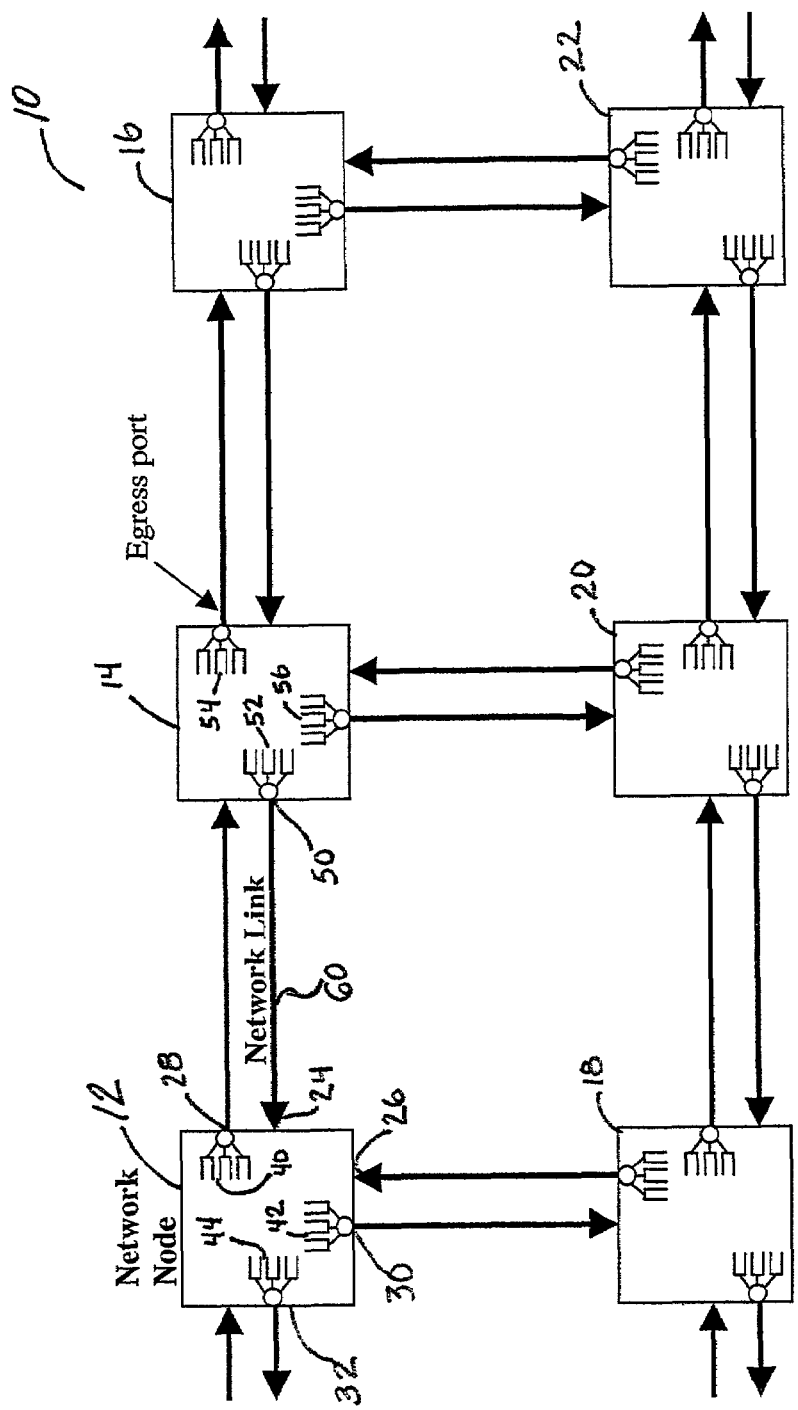
FIG. 1 is a block diagram that illustrates a packet network that includes various packet switches with closed loop congestion mechanisms to provide congestion management at the egress ports of the various packet switches.

FIG. 1 is a block diagram that illustrates a packet network 10 that includes various packet switches with queuing closed loop congestion mechanisms to provide congestion management at the egress ports of the various packet switches. The packet network 10 includes a packet switch 12, a packet switch 14, a packet switch 16, a packet switch 18, a packet switch 20, and a packet switch 22. Each of these packet switches are in communication with adjoining packet switches through the various telecommunications links shown in FIG. 1 with arrows to denote the direction of flow of the data or packets of information.

Each of the packet switches include, generally, a plurality of ingress ports, such as an ingress port 24 and an ingress port 26 of the packet switch 12, a switch matrix, not shown in FIG. 1, operable to receive packets from the plurality of ingress ports and to provide packet switching based on the contents of such packets of information to one of a plurality of egress ports. The various packet switches will also generally include a plurality of egress ports, such as an egress port 28, an egress port 30, and an egress port 32 of the packet switch 12. The symbols shown at the egress ports of the various packet switches of the packet network 10 of FIG. 1 represent a queuing congestion mechanism, which is described more fully below in connection with FIG. 2 according to one embodiment of the present invention. Although not expressly shown in FIG. 1, the various packet switches, which is apparent to one of ordinary skill in the art, will include various computer software and control circuitry to provide the desired functionality, operations, and administrative functions of the various packet switches.

Referring now to the packet switch 14 of the packet network 10, a telecommunications link 60 between the packet switch 14 and the packet switch 12 is shown for packets of information that flow from an egress port 50 of the packet switch 14 to the ingress port 24 of the packet switch 12. The egress port 50 is enabled or controlled through a queuing congestion mechanism 52 of the packet switch 14. A congestion mechanism 54 and a congestion mechanism 56 are also illustrated as part of the packet switch 14 to provide congestion management for their respective egress ports of the packet switch 14.

In operation, the various packets of information that are communicated through the packet network 10 may be divided into various classes or levels of service, such as different classes of QoS, that are assigned relative priorities. As traffic increases throughout the data or packet network 12, the queuing congestion mechanism of the present invention is enabled in connection with some or all of the egress ports of the various packet switches. The queuing congestion mechanism provides a closed loop congestion mechanism by controlling the rate that packets of information are provided from one or more queues to a scheduler, such as a strict scheduler, at an egress port based on one or more other queues associated with the same egress port. In essence, inputs derived from selected queues are used to adjust the rate at which another queue is serviced by the scheduler. In other embodiments, the queuing congestion mechanism also provides policy decisions in one or more queues based on conditions, such as capacity loading, at one or more other queues associated with the same egress port.

Figure 2:
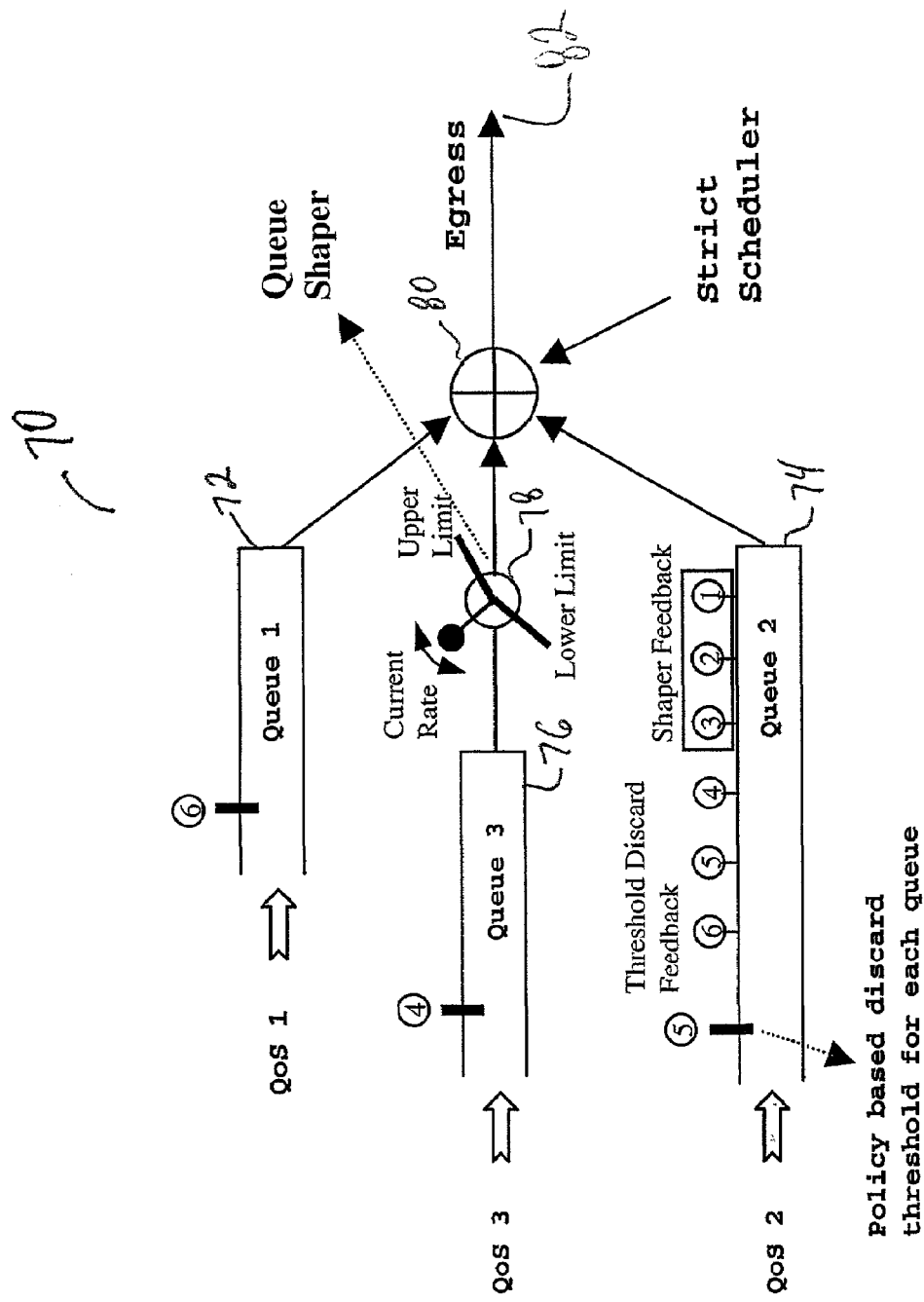
FIG. 2 is a diagram that illustrates, according to one embodiment, the functionality of the closed loop congestion mechanism of the present invention.

FIG. 2 is a diagram that illustrates, according to one embodiment of the present invention, the functionality of a queuing congestion mechanism 70, such as a closed loop congestion mechanism, to provide congestion management at an egress port 82 of a packet switch, such as the packet switch 14 illustrated in FIG. 1.

The queuing congestion mechanism 70, in one embodiment, includes a first queue 72, a second queue 74, a third queue 76, a queue shaper 78, and a scheduler 80. The queuing congestion mechanism 70 will functionally be situated at one or more egress ports of a packet switch to provide congestion management. Generally, the first queue 72, the second queue 74, and the third queue 76 will, in one embodiment, each have an input, an output, a defined capacity, and will be associated with a priority, class, level and/or quality of service or traffic such that packets of information from such traffic will be routed or associated with the appropriate queue. For example, real time voice and video will generally receive a higher priority than non-real time data communications. The packets of information are, in one embodiment, communicated from a switch matrix or switch fabric of the packet switch, not shown in FIG. 2, into the inputs of the appropriate queues. One or more ingress ports will serve as the input to any such packet switch.

As a queue begins to fill, the amount of information or packets stored in such a queue may be referred to as the loading or the loading of the capacity of the queue. For example, if the bandwidth of the egress port 82 is less than the amount of data being provided to all of the queues, the queues will begin to fill and congestion may begin at the egress port 82.

In operation and assuming that the first queue 72 has the highest queue priority while the third queue 76 has the lowest queue priority, the scheduler 80 is operable to receive the packets of information from the output of the first queue 72, the second queue 74, and the third queue 76 so that this information may be ultimately communicated to an associated egress port 82 as shown. The scheduler 80, in the embodiment as shown, receives packets of information from both the first queue 72 and the second queue 74, and from the third queue 76 at a data rate as determined by the queue shaper 78. In one embodiment, the scheduler 80 is provided as a strict scheduler, and, in another embodiment, the scheduler 80 is provided as a weighted fair queuing scheduler.

The queue shaper 78 is shown controlling the data rate in which packets of information are provided from the third queue 76 to the scheduler 80. The setting of the data rate of the queue shaper 78 is controlled based on the loading of the second queue 74. For example, the numeral 1 is shown on the second queue 74 at a minimal loading level. As such, in one embodiment, lower priority third queue 76 can continue to have its data or packets of information provided to the scheduler 80 at a somewhat rapid data rate. As such, the queue shaper 78 is provided or set at a relatively fast data rate as determined by or based on the loading of the second queue 74.

As the second queue 74 continues to load, as indicated by the loading levels or thresholds of the second queue 74 that are marked with the numerals 2 and 3, the feedback to control the setting of the data rate of the queue shaper 78 is provided by the closed loop feedback from the second queue 74 to reduce the data rate setting of the queue shaper 78 so that packets of information provided from the output of the third queue 76, which is a lower priority traffic, to the scheduler 80 are reduced. This illustrates the concept of "closed loop" control in the queuing congestion mechanism 70 by allowing one or more queues to control data rates or other aspects of one or more other queues that are also associated with the egress port 82 based on the loading of such controlling queue.

Stated another way, the loading levels of the second queue 74 are thresholds that serve as the trigger points for adjusting the queue shaper 78 of the third queue 76 up or down. Therefore, if the traffic entering the congestion mechanism is greater than the bandwidth available at the egress, then the second queue 74 will begin to fill. Consequently, the feedback from the second queue 74 will cause the third queue 76 to be rated down, which in turn will allow for more of the packets in the second queue 74 to be served.

Another aspect of the present invention is illustrated by the numerals 4, 5 and 6, which are listed one after the other above the second queue 74, and which represent loading indicators for the second queue 2, similar to the numerals 1, 2, and 3 just described above. As the second queue 74 begins to load up to a loading indicator of 4, 5 or 6, other actions may need to be taken at the egress port 82 to prevent or manage congestion. In one embodiment, when the second queue 74 reaches a loading level designated by the numeral 4, a discard policy is enabled in another queue. For example, the corresponding numeral 4 that is shown associated with the third queue 76 represents a discard policy that will now be in effect such that if the loading level of the third queue 76 reaches the loading level indicated by the position of the numeral 4 on the third queue 76, additional packets of information will be discarded until the loading is reduced. This is an example of another aspect of the present invention in which discard policies for one queue are controlled by one or more other queues.

Similarly, the loading level 5 of the second queue 74 will trigger the application of a discard policy at the second queue 74 itself when the second queue 74 reaches the loading level indicated by the position 5 that is designated with the thick mark on the far left of the second queue 74. This is an example of a queue enabling a discard policy for itself. Finally, the loading level 6 shown of the second queue 74 will trigger the discard policy labeled with the numeral 6 as shown in connection with the loading of the first queue 72. If this condition is reached, and assuming that the first queue 72 is associated with the highest priority traffic, congestion is reaching a critical stage at the egress port 82 and even high priority traffic must be discarded when such policy conditions are met. This is an example of how inputs from one queue could be utilized to control policy decision for other queues, again, forming closed loop control at the point of congestion.

It should be understood that even though three queues are illustrated in FIG. 2, the present invention may be implemented using virtually any number of desired queues, which are preferably implemented in software. The scheduler 80, similar to the queue shaper 78 and the various queues discussed above, will preferably be implemented in software, but could be implemented in hardware or firmware. It should also be noted that the queue shaper 78 will, preferably, include a buffer or memory area to store the data or packets of information provided from the third queue 76 to the scheduler 80. It should also be understood that the queuing congestion mechanism 70 of the present invention may be implemented as part of or for use with a packet switch, such as an ATM, MPLS, Frame Relay, Ethernet, or IP switch or router, or any other available data or packet switch that may be used in a packet network.

Figure 3:
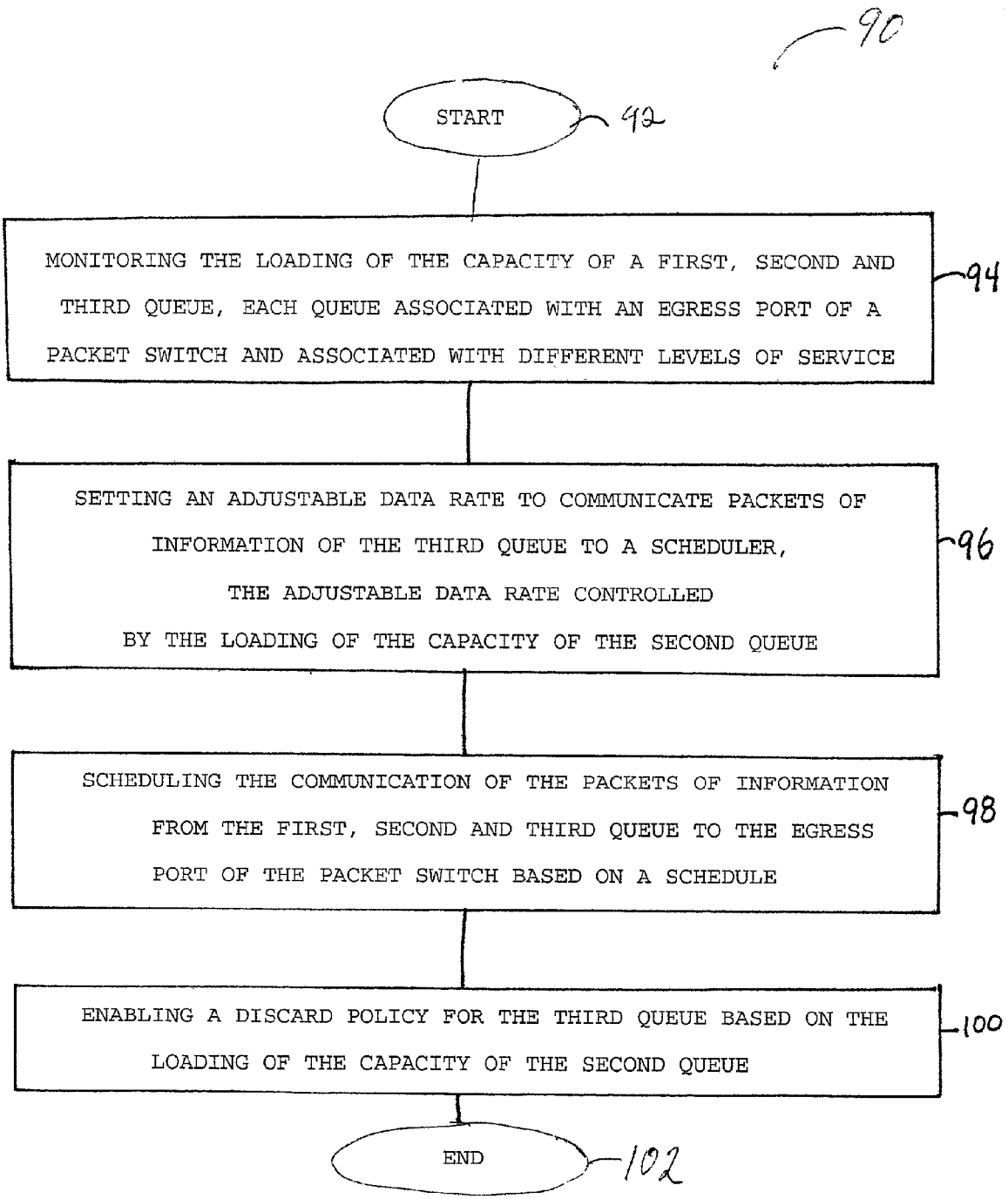
FIG. 3 is a flowchart that illustrates a method for performing queuing closed loop congestion management at an egress port of a packet switch of a packet network.

FIG. 3 is a flowchart that illustrates a method 90 for performing queuing closed loop congestion management at an egress port of a packet switch of a packet network. The method 90 begins at start block 92 and proceeds to block 94. At block 94, the loading of a first queue, a second queue, and a third queue is monitored. The loading of a queue may be referred to as the loading of the capacity of the queue. The queues will, preferably, be implemented in software and will have a defined capacity. Each such queue is associated with a different class or level of service, such as a QoS.

Proceeding next to block 96, an adjustable data rate is set to communicate packets of information stored in the third queue to a scheduler, which also will be preferably implemented in software. The setting of the adjustable data rate will be controlled by the loading of the second queue. For example, in one embodiment, as the second queue continues to load or have its capacity filled, the adjustable data rate setting may be adjusted so that the data provided from the third queue to the scheduler is provided at a lower data rate. Assuming that the third queue contains packets of information from a class or level of service with a lower priority than the packets of information stored in the second queue, this would potentially result in the second queue having a higher priority over the third queue and illustrates an aspect of the present invention where the loading of one queue is used to control the delivery from another queue.

The method 90 proceeds next to block 98 where the scheduler is used to communicate packets of information from the first, second, and third queue to the egress port of the packet switch. A schedule may be implemented in the scheduler using any of a variety of a variety of algorithms, such as a strict scheduler that provides packets of information from the various queues based on a priority ranking that is assigned to each queue. For example, if the first queue is considered the highest priority queue and data is available at the first queue to be communicated to the egress port, it will always take priority over data from any of the other queues. Once data has been communicated from the first queue, the strict scheduler would again look to the first queue to determine if more data is present. If no data is present, the strict scheduler then would proceed to the queue that has the next highest priority to determine if data is available or is waiting in such a queue.

The method 90 then proceeds to block 100 where a second aspect of the present invention is illustrated. At block 100, the method 90 includes enabling a discard policy, such as a packet discard, for the third queue based on the loading or congestion of the second queue. Thus, assuming that the third queue is associated with a class or level of service with a lower priority than the second queue, this aspect of the invention provides that packets of information from the lower priority queue will be discarded based on congestion occurring in a higher priority queue. At such a time, decisions need to be made as to the discard of packets. The method 90 concludes at end block 102.

Thus, it is apparent that there has been provided, in accordance with the present invention, a queuing congestion mechanism and method that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components of the present invention may be combined or integrated in another system or certain features may not be implemented. Also, the components, techniques, systems, sub-systems, layers, and methods described and illustrated in the preferred embodiment as discrete or separate may be combined or integrated with other components, systems, modules, techniques, or methods without departing from the scope of the present invention. Other examples of changes, substitutions, and alterations are readily ascertainable by one skilled in the art and could be made without departing from the spirit and scope of the present invention.

What is claimed is:

1. A queuing congestion device to provide congestion management at an egress port of a packet switch, the queuing congestion mechanism comprising:
a first queue having an input, an output, and a capacity, the first queue operable to receive packets of information of a first type at its input that are destined to be communicated to the egress port through its output;
a second queue having an input, an output, and a capacity, the second queue operable to receive packets of information of a second type at its input that are destined to be communicated to the egress port through its output;
a third queue having an input, an output, and a capacity, the third queue operable to receive packets of information of a third type at its input that are destined to be communicated to the egress port through its output, wherein the second queue has a priority intermediate to a priority of the first queue and a priority of the third queue;
a scheduler operable to receive the packets of information from the output of the first queue, the output of the second queue, and the output of the third queue, and to communicate the packets of information to the egress port of the packet switch based on a schedule; and
a queue shaper operable to set an adjustable rate in which the packets of information of the third queue are communicated to the scheduler, wherein a discard policy is enabled for the third queue based on the loading of the capacity of the second queue.

2. The queuing congestion device of claim 1, wherein the adjustable rate is controlled by a loading of the capacity of the second queue.

3. The queuing congestion device of claim 2, wherein a discard policy is enabled for the second queue based on the loading of the capacity of the second queue.

4. The queuing congestion device of claim 3, wherein a discard policy is enabled for the first queue based on the loading of the capacity of the second queue.

5. The queuing congestion device of claim 1, wherein the priority of the first queue is higher than the priority of the third queue.

6. The queuing congestion device of claim 5, wherein the scheduler is a strict scheduler and the schedule is determined by priorities of the queues.

7. The queuing congestion device of claim 5, wherein the scheduler is a weighted fair queuing scheduler and the schedule is determined by weighting the priorities of the queues.

8. The queuing congestion device of claim 1, wherein each queue corresponds to a service category queue.

9. The queuing congestion device of claim 1, wherein the packet switch is an ATM switch of an ATM network.

10. The queuing congestion device of claim 1, wherein the packet switch is an IP switch of an IP network.

11. The queuing congestion device of claim 1, wherein the packet switch is a frame relay switch of a frame relay network.

12. The queuing congestion device of claim 1, wherein the packet switch is an MPLS switch of an MPLS network.

13. The queuing congestion device of claim 1, wherein the packet switch is an Ethernet switch of an Ethernet network.

14. A packet switch with at least one queuing congestion mechanism for use in a packet network that includes a plurality of packet switches in communication through a plurality of telecommunications links, the packet switch comprising:
a plurality of ingress ports, each of the plurality of ingress ports operable to receive packets of information from one of the plurality of telecommunications links of the packet network;
a plurality of egress ports, each of the plurality of egress ports operable to communicate packets of information to one of the plurality of telecommunications links of the packet network;
a switch matrix operable to receive packets of information from the plurality of ingress ports, to perform packet switching on the packets of information, and to communicate the packets of information to a designated one of the plurality of egress ports; and
at least one queuing congestion mechanism operable to provide congestion management at one of the plurality of egress ports, the congestion mechanism including:
a first queue having an input, an output, and a capacity, the first queue operable to receive packets of information of a first type at its input that are destined to be communicated to the egress port through its output,
a second queue having an input, an output, and a capacity, the second queue operable to receive packets of information of a second type at its input that are destined to be communicated to the egress port through its output,
a third queue having an input; an output, and a capacity, the third queue operable to receive packets of information of a third type at its input that are destined to be communicated to the egress port through its output, wherein the second queue has a priority intermediate to a priority of the first queue and a priority of the third queue,
a scheduler operable to receive the packets of information from the output of the first queue, the output of the second queue, and the output of the third queue, and to communicate the packets of information to the egress port of the packet switch based on a schedule, and
a queue shaper operable to set an adjustable rate in which the packets of information of the third queue are communicated to the scheduler, a discard policy is enabled for the third queue based on the loading of the capacity of the second queue.

15. The packet switch of claim 14, wherein the adjustable rate is controlled by a loading of the capacity of the second queue.

16. The packet switch of claim 14, wherein the packet network is an ATM network and the packet switch is an ATM switch.

17. The packet switch of claim 14, wherein the packet network is an MPLS network and the packet switch is an MPLS switch.

18. A method for performing queuing closed loop congestion management in a packet switch of a packet network, the method comprising:

monitoring the loading of the capacity of a first queue, a second queue, and a third queue to hold packets of information communicated through the packet network, each queue being associated with an egress port of the packet switch and associated with different levels of service, wherein the second queue has a priority intermediate to a priority of the first queue and a priority of the third queue;

setting an adjustable data rate to communicate the packets of information of the third queue to a scheduler, wherein the adjustable data rate is controlled by the loading of the capacity of the second queue;

scheduling the communication of the packets of information from the first queue, the second queue, and the third queue to the egress port of the packet switch based on a schedule; and enabling a discard policy for the third queue based on the loading of the capacity of the second queue.

19. The method of claim 18, further comprising enabling a discard policy for the second queue based on the loading of the capacity of the second queue.

20. The method of claim 18, further comprising enabling a discard policy for the first queue based on the loading of the capacity of the second queue.

* * * * *